United States Patent
Kim (10) Patent No.: US 9,811,058 B2
(45) Date of Patent: Nov. 7, 2017

(54) APPARATUS AND METHOD FOR CONTROLLING INPUT SIGNAL

(71) Applicant: LSIS CO., LTD., Anyang-si, Gyeonngi-do (KR)

(72) Inventor: Jung Wook Kim, Cheonan-si (KR)

(73) Assignee: LSIS CO., LTD., Anyang-si (KR)

( * ) Notice: Subject to any disclaimer, the term of this patent is extended or adjusted under 35 U.S.C. 154(b) by 1065 days.

(21) Appl. No.: 13/875,183

(22) Filed: May 1, 2013

(65) Prior Publication Data
US 2013/0345830 A1    Dec. 26, 2013

(30) Foreign Application Priority Data

Jun. 21, 2012  (KR) ................. 10-2012-0066736

(51) Int. Cl.
*G05B 15/02*      (2006.01)
*G05B 19/042*     (2006.01)

(52) U.S. Cl.
CPC ......... *G05B 15/02* (2013.01); *G05B 19/0423* (2013.01)

(58) Field of Classification Search
CPC ... H03F 1/3247; H03F 3/45475; G01D 3/022; H04L 27/368; H03D 7/165
See application file for complete search history.

(56) References Cited

U.S. PATENT DOCUMENTS

| | | | | |
|---|---|---|---|---|
| 5,111,154 A * | 5/1992 | Nakagawara | ...... | H03H 11/0422 330/107 |
| 7,859,269 B1 * | 12/2010 | Laraia | ...... | G01D 3/022 324/527 |
| 2003/0006783 A1 * | 1/2003 | Min | ...... | G01R 27/2605 324/676 |
| 2005/0256660 A1 * | 11/2005 | Laraia | ...... | G01D 3/028 702/107 |
| 2008/0197833 A1 * | 8/2008 | Stoop | ...... | H04R 25/356 324/76.12 |
| 2010/0073206 A1 * | 3/2010 | Lee | ...... | H03M 1/1033 341/118 |

(Continued)

FOREIGN PATENT DOCUMENTS

| | | |
|---|---|---|
| CN | 101446803 | 6/2009 |
| CN | 102136853 | 7/2011 |

(Continued)

OTHER PUBLICATIONS

Japan Patent Office Application Serial No. 2013-101872, Office Action dated Feb. 12, 2014, 3 pages.

(Continued)

*Primary Examiner* — Manuel L Barbee
*Assistant Examiner* — Raymond Nimox
(74) *Attorney, Agent, or Firm* — Lee Hong Degerman Kang & Waimey (57) ABSTRACT

Disclosed are an apparatus and a method for controlling a signal such that a PLC input signal is equalized to a reference input signal. The apparatus includes an error calculation unit to calculate an error by using the PLC input signal and the reference input signal; an estimation parameter calculation unit to calculate an estimation parameter by using the reference input signal, the PLC input signal and the error; and an error correction unit to correct the error by using the estimation parameter such that the PLC input signal is equalized to the reference input signal.

5 Claims, 5 Drawing Sheets

(56) References Cited

U.S. PATENT DOCUMENTS

2010/0156534 A1* 6/2010 Kim .................... H03F 3/45475
                                                                330/254

FOREIGN PATENT DOCUMENTS

| JP | H06224712   | 8/1994  |
|----|-------------|---------|
| JP | 2004-304738 | 10/2004 |
| JP | 2009267486  | 12/2009 |
| KR | 20010076760 | 8/2001  |
| KR | 20070003173 | 1/2007  |

OTHER PUBLICATIONS

The State Intellectual Property Office of the People's Republic of China Application Serial No. 201310247607.5, Office Action dated Jun. 24, 2015, 6 pages.
Korean Intellectual Property Office Application No. 10-2012-0066736, Office Action dated Feb. 28, 2017, 4 pages.
European Patent Office Application No. 13165934.4, Search Report dated Aug. 23, 2017, 6 pages.

* cited by examiner

APPARATUS AND METHOD FOR CONTROLLING INPUT SIGNAL

CROSS-REFERENCE TO RELATED APPLICATIONS

The present application claims priority under 35 U.S.C. 119 to Korean Patent Application No. 10-2012-0066736 (filed on Jun. 21, 2012), which is hereby incorporated by reference in its entirety.

BACKGROUND

The embodiment relates to an apparatus and a method for controlling an input signal, which can exactly measure a signal input to a PLC (Programmable Logic Controller).

Automatic equipment used in industrial fields consists of mechanical equipment including a relay. There is a difficulty to change the automatic equipment consisting of the mechanical equipment because internal circuits of the automatic equipment must be changed. In order to overcome such a difficulty, the PLC is used.

The PLC includes an analog input module. The analog input module of the PLC may include a circuit for converting an analog input signal into a digital value. The analog input signal may include an analog direct current or an analog direct current voltage.

In order to convert an analog input signal into a digital signal, the analog input module of the PLC may measure a value of the analog input signal after receiving the analog input signal. However, since hardware, such as a resistor or an amplifier (OP-Amp) which constitutes the analog input module, causes an error in an analog input signal value, it is difficult to exactly measure the analog input signal value.

Therefore, after a reference signal is input to the analog input module, the analog input signal may be corrected based on the reference signal in order to exactly measure the analog input signal value. However, since the signal correcting scheme using a linear equation according to the related art measures the analog input signal several times, this scheme requires much time and, when the analog input signal is a nonlinear signal, this scheme cannot be applied.

SUMMARY

The embodiment provides an apparatus and a method for controlling an input signal capable of improving the performance of an analog input module by correcting an error of a signal received in the analog input module.

Further, the embodiment provides an apparatus and a method for adaptively controlling a signal capable of correcting an error of a signal received in an analog input module according to a variation of PLC ambient environment.

According to the embodiment, there is provided an apparatus for controlling a signal such that a PLC input signal is equalized to a reference input signal. The apparatus includes an error calculation unit to calculate an error by using the PLC input signal and the reference input signal; an estimation parameter calculation unit to calculate an estimation parameter by using the reference input signal, the PLC input signal and the error; and an error correction unit to correct the error by using the estimation parameter such that the PLC input signal is equalized to the reference input signal.

According to the embodiment, there is provided a method of controlling a signal such that a PLC input signal is equalized to a reference input signal. The method includes generating a PLC output signal by applying a first transfer function to the PLC input signal; generating a reference output signal by applying a second transfer function to the reference input signal; calculating an error of the PLC input signal by using the PLC output signal and the reference output signal; calculating an estimation parameter by using the reference input signal, the PLC output signal and the error; and correcting the error by using the estimation parameter such that the PLC input signal is equalized to the reference input signal.

According to the embodiment, the performance of the analog input module can be improved by correcting the error of the signal received in the analog input module.

According to the embodiment, the error of the signal received in the analog input module can be adaptively corrected according to a variation of PLC ambient environment.

DETAILED DESCRIPTION OF THE EMBODIMENTS

Hereinafter, embodiments will be described in detail with reference to accompanying drawings so that those skilled in the art can easily work with the embodiments. However, the embodiments may not be limited to those described below, but have various modifications. The elements, which are not concerned with the description of the embodiments may be omitted in the drawings for the purpose of convenience or clarity. The same reference numbers will be assigned to the same elements throughout the drawings.

In the following description, when a part is referred as to be connected to the other part, the parts are not only directly connected to each other, but also electrically connected to each other while interposing another part therebetween.

In the following description, when a predetermined part is referred as to "include" a predetermined component, the predetermined part does not exclude other components, but may further include other components unless indicated otherwise.

Figure 1:
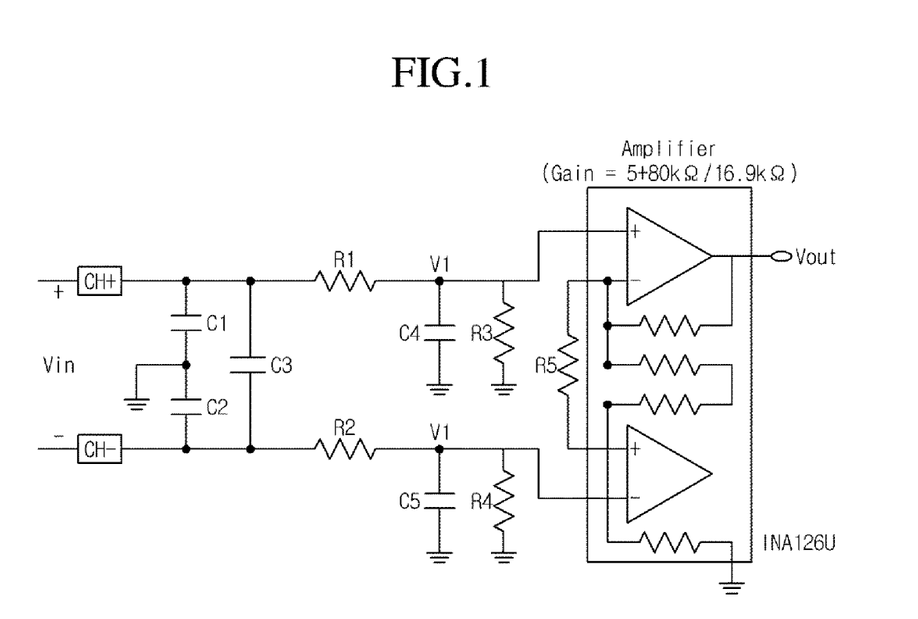
FIG. 1 is a block diagram showing an apparatus for providing an image according to the embodiment.

FIG. 1 is a block diagram showing an apparatus for providing an image according to the embodiment.

Referring to FIG. 1, an analog input module includes an input channel, a noise reducing unit, a filter and an amplifier.

The input channel may include a plus terminal CH+ and a minus terminal CH− and an input voltage Vin may be input to the plus and minus terminals CH+ and CH−.

The noise reducing unit includes a plurality of capacitors C1, C2 and C3. One terminal of the first capacitor C1 may be connected to the plus terminal CH+ of the input channel and the other terminal of the first capacitor C1 may be grounded. One terminal of the second capacitor C2 may be connected to the minus terminal CH− of the input channel and the other terminal of the second capacitor C2 may be grounded. One terminal of the third capacitor C3 may be connected to the plus terminal CH+ of the input channel and the other terminal of the third capacitor C3 may be connected to the one terminal of the second capacitor C2 connected to the minus channel CH− of the input channel. The noise reducing unit including the plurality of capacitors may be remove a noise from an analog input signal received through the input channel. Although it is assumed in the embodiment that the noise reducing unit includes only three capacitors, the embodiment is not limited thereto and it is not necessary to limit the configuration of the noise reducing unit to capacitors.

The filter includes a plurality of resistors R1 and R2 and a plurality of capacitors C4 and C5. The filter including the resistors and the capacitors, which is called an RC filter, allows a specific frequency signal of the input signal to pass therethrough or to be blocked, so that the filter allows the input signal to selectively pass therethrough. One terminal of the first resistor R1 may be connected to the one terminal of the third capacitor C3 of the noise reducing unit and one terminal of the second resistor R2 may be connected to the other terminal of the third capacitor C3 of the noise reducing unit. The other terminal of the first resistor R1 may be connected to one terminal of the fourth capacitor C4, and the other terminal of the second resistor R2 may be connected to one terminal of the fifth capacitor C5. The other terminals of the fourth and fifth capacitors C4 and C5 may be grounded. A first voltage V1 applied to the fourth and fifth capacitors C4 and C5 may be considered as the input signal measured at the analog input module when taking into account the features of an RC filter. The first voltage V1 is a signal which is output from the filter according to a predetermined transfer function after the signal has been input to the PLC analog input module and a noise of the input signal has been removed. A transfer function T(s) in Laplace domain which is a continuously time domain may be expressed as following Equation 1:

$$T(s) = \frac{\text{Gain}}{RCs+1} = \frac{0.965}{212.9 \times 10^{-6} s + 1} \quad \text{[Equation 1]}$$

In Equation 1, R is the first or second resistor R1 or R2, C is the fourth or fifth capacitor C4 or C5. In the case of C1=C2=0.01 μF, C3=0.47 μF, C4=C5=0.0047 μF, R1=R2=453 kΩ and R3=R4=49.9 kΩ, the transfer function having the coefficient and the gain of Equation 1 may be calculated.

Further, the transfer function may be expressed as a time division domain transfer function of following Equation 2:

$$T[z] = \frac{0.6768z + 0.6768}{z + 0.4027} \quad \text{[Equation 2]}$$

In the case of the sampling period of 0.001 second, Equation 2 is obtained by z-transforming Equation 1 which is a Laplace transfer function.

The amplifier may include a plurality of Op-AMPs and a plurality of resistors. An amplifier having an amplifier gain required for the function of the PLC analog input module may be used. The amplifier shown in FIG. 1 is the amplifier of the model No. INA126U having a gain $$\left(\text{Gain} = 5 + \frac{80 \text{ k}\Omega}{16.9 \text{ k}\Omega}\right).$$

Figure 2:
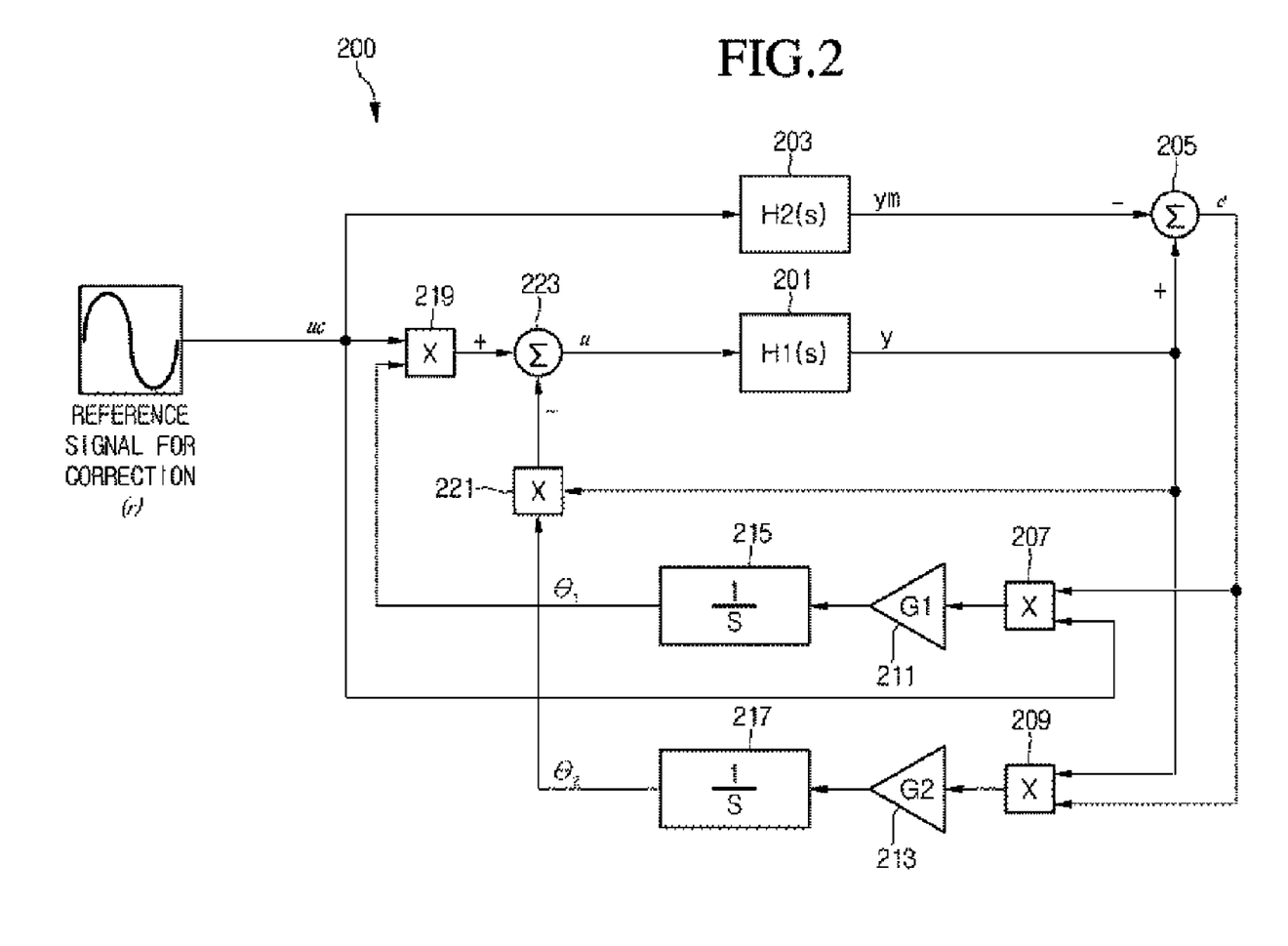
FIG. 2 is a view substantially showing an apparatus for controlling a PLC analog input signal in continuous time domain according to the embodiment.

FIG. 2 is a view substantially showing an apparatus for controlling a PLC analog input signal in continuous time domain according to the embodiment.

Referring to FIG. 2, the PLC analog input signal controlling apparatus 200 includes a first operation unit 201, a second operation unit 203, an error calculation unit, a first parameter operation unit, a second parameter operation unit, an error correction unit.

The first operation unit 201 applies a first transfer function $H_1(s)$ to an analog input signal u, thereby generating an analog output signal y. the analog input signal u and the analog output signal y signify signals before correction. As the first operation unit 201 corresponds to the analog input module of FIG. 1, the gain of the first transfer function $H_1(s)$ may include not '1' but a constant such as the transfer function T(s) of Equation 1. When the analog output signal y is denoted as a first-order differential equation in time domain, the analog output signal y is expressed as following Equation 3:

$$\frac{dy}{dt} = -\frac{1}{RC}y + \frac{\text{Gain}}{RC}u \quad \text{[Equation 3]}$$

where R denotes a resistor constituting the filter included in the first operation unit 201, and C denotes a capacitor constituting the filter included in the first operation unit 201.

The second operation unit 203 generates a reference output signal $y_m$ by applying a second transfer function $H_2(s)$ to the reference input signal $u_c$. The reference input signal $u_c$ is input to the analog input signal controlling apparatus 200 in order to correct the analog input signal u. That is, the reference input signal $u_c$ and the reference output signal $y_m$ signify reference signals for correcting the analog input signal u and the analog output signal y, that are, signals after correction. The second transfer function $H_2(s)$ has the same degree and coefficient as those of the first transfer function $H_1(s)$. Only, the gain of the transfer function $H_2(s)$ is '1' and in this regard, the second transfer function $H_2(s)$ is different from the first transfer function $H_1(s)$. If the second transfer function $H_2(s)$ is expressed corresponding to Equation 1, the second transfer function $H_2(s)$ may be expressed as following Equation 4:

$$H2(s) = \frac{1}{RCs+1} \quad \text{[Equation 4]}$$

The reference output signal $y_m$ may be expressed in a form of a first-order differential equation in time domain as following Equation 5:

$$\frac{dy_m}{dt} = -a_m y_m + b_m u_c \quad \text{[Equation 5]}$$

wherein $a_m$ and $b_m$ are parameters of the reference signal.

The error calculation unit generates an error signal e by calculating a difference between the analog output signal y generated from the first operation unit 201 and the reference output signal $y_m$ generated from the second operation unit 203. The error calculation unit may include a first sigma unit 205. The error signal e may be expressed as following Equation 6:

$$e = y - y_m \quad \text{[Equation 6]}$$

Equation 6 is an equation derived for estimating a parameter for correcting the analog input signal u. That is, a parameter, which allows the analog input signal u to approximate to the reference input signal $u_c$ by using the error signal e, may be evaluated.

The first parameter operation unit includes a first multiplier 207, a first amplifier 211 and a first integrator 215.

The first multiplier 207 multiplies the reference signal $u_c$ and the error signal e generated from the error calculation unit to generate a multiplication result.

The first amplifier 211 amplifies the multiplication result generated from the first multiplier 207 at the first gain $G_1$ to generate an amplification result.

The first integrator 215 integrates the amplification result generated from the first amplifier 211 to generate an integration result.

The operations of the first multiplier 207, the first amplifier 211 and the first integrator 215 may be sequentially performed, but the embodiment is not limited thereto.

Following Equation 7 is for estimating a first parameter $\theta_1$ based on the error signal e, the reference input signal $u_c$ and the first gain $G_1$.

$$\frac{d\theta_1}{dt} = -G_1 u_c e \quad \text{[Equation 7]}$$

The first parameter operation unit may evaluates the first parameter $\theta_1$ expressed as Equation 7 by using the first multiplier 207, the first amplifier 211 and the first integrator 215.

The second parameter operation unit includes a second multiplier 209, a second amplifier 213 and a second integrator 217.

The second multiplier 209 multiplies the analog output y generated for the first operation unit 201 and the error signal e generated from the error calculation unit to generate a multiplication result.

The second amplifier 213 amplifies the multiplication result generated from the second multiplier 209 at the second gain $G_2$ to generate an amplification result.

The second integrator 217 integrates the amplification result generated from the second amplifier 213 to generate an integration result.

The operations of the second multiplier 209, the second amplifier 213 and the second integrator 217 may be sequentially performed, but the embodiment is not limited thereto.

Following Equation 8 is for estimating a second parameter $\theta_2$ based on the error signal e, the reference input signal $u_c$ and the second gain $G_2$.

$$\frac{d\theta_2}{dt} = G_2 y e \quad \text{[Equation 8]}$$

The second parameter operation unit may evaluates the second parameter $\theta_2$ expressed as Equation 8 by using the second multiplier 209, the second amplifier 213 and the second integrator 217.

Equations 7 and 8 are calculated by using following Equation 10 derived from Equations 3, 5 and 6 and following Equation 9.

$$u = \theta_1 u_c - \theta_2 y \quad \text{[Equation 9]}$$

Equation 9 is derived in terms of the analog input signal u in order to estimating the first and second parameters $\theta_1$ and $\theta_2$. The input signal after correction may be evaluated by using Equation 9 as. Referring to Equation 9, the analog signal u is corrected by using the results of applying the first parameter $\theta_1$ to the reference input signal $u_c$ and applying the second parameter $\theta_2$ to the analog output signal y. Thus, the control of correcting an input according to an output may be called an adaptive control. An error of a signal received in the analog input module may be corrected according to a variation of PLC ambient environment, for example, a variation of ambient temperature, and an error of an non-linear input signal may be also corrected through the adaptive control.

Meanwhile, when the error signal e derived from Equation 4 is convergent to 0 (zero), the analog input signal $$u_c = \frac{1}{\theta_1} u + \frac{\theta_2}{\theta_1} y$$

u is convergent to the reference input signal $u_c$. In order to estimate the first and second parameters $\theta_1$ and $\theta_2$ by using the case that the error signal e is convergent to 0, following Equation 10 may derived by using Equations 3, 5, 6 and 9:

$$\frac{de}{dt} = -a_m e - \left(\frac{\text{Gain}}{RC}\theta_2 + \frac{1}{RC} - a_m\right)y + \left(\frac{\text{Gain}}{RC}\theta_1 - b_m\right)u_c \quad \text{[Equation 10]}$$

An estimation equation, which is derived by integrating Equation 10 and has the error signal e, and the first and second parameters $\theta_1$ and $\theta_2$ as dependent variables, may be expressed as following Equation 11:

$$V(e, \theta_1, \theta_2) = \frac{1}{2}\left[e^2 + \frac{1}{G_2}\frac{RC}{\text{Gain}}\left(\frac{\text{Gain}}{RC}\theta_2 + \frac{1}{RC} - a_m\right)^2 + \frac{1}{G_1}\frac{RC}{\text{Gain}}\left(\frac{\text{Gain}}{RC}\theta_1 - b_m\right)^2\right] \quad \text{[Equation 11]}$$

Following Equation 12 is a differential equation which results from differentiating the estimation equation of Equation 11 with respect to time t.

$$\frac{dv}{dt} = e\frac{de}{dt} + \frac{1}{G_2}\left(\frac{\text{Gain}}{RC}\theta_2 + \frac{1}{RC} - a_m\right)\frac{d\theta_2}{dt} + \frac{1}{G_1}\left(\frac{\text{Gain}}{RC}\theta_1 - b_m\right)\frac{d\theta_1}{dt}$$

$$= -a_m e^2 + \frac{1}{G_2}\left(\frac{\text{Gain}}{RC}\theta_2 + \frac{1}{RC} - a_m\right)\left(\frac{d\theta_2}{dt} - G_2 y e\right) + \frac{1}{G_1}\left(\frac{\text{Gain}}{RC}\theta_1 - b_m\right)\left(\frac{d\theta_1}{dt} + G_1 u_c e\right) \quad \text{[Equation 12]}$$

Equation 12 is an equation in terms of the first and second parameters $\theta_1$ and $\theta_2$, which is derived from the estimation differential equation. According to the embodiment, the error signal e of Equation 6 must be convergent to 0. In order that the error signal e is convergent to 0, a differential value (de/dt) of the error signal of Equation 10 must be less than 0. In order that a differential value (de/dt) of the error signal is less than 0, the estimation equation $V(e,\theta_1,\theta_2)$ of Equation 11 must be greater than 0. Finally, in order that the estimation equation $V(e,\theta_1,\theta_2)$ of Equation 11 is greater than 0, a differential value (dv/dt) of the estimation equation of Equation 12 must be less than 0. When the differential values of the first and second parameters $\theta_1$ and $\theta_2$ are respectively estimated as Equations 7 and 8, the differential value (dv/dt) of the estimation function of Equation 12 is less than 0.

The error correction unit performs the calculation such as Equation 9. The error correction unit may include a third multiplier 219, a fourth multiplier 221 and a second sigma unit 223.

The third multiplier 219 may generate a result of applying the first parameter $\theta_1$ to the reference input signal $u_c$.

The fourth multiplier 221 may generate a result of applying the second parameter $\theta_2$ to the analog output signal y.

The second sigma unit 223 may generate a difference value between the results generated from the third multiplier 219 and generated from the fourth multiplier 221. The difference value between the results generated from the third multiplier 219 and generated from the fourth multiplier 221 signifies the analog input signal u. As expressed in Equation 9, a next analog input signal u is generated by using the reference input signal $u_c$ and the value output from the system such as the first operation unit 201 to which a previous analog input signal u is input.

Figure 3:
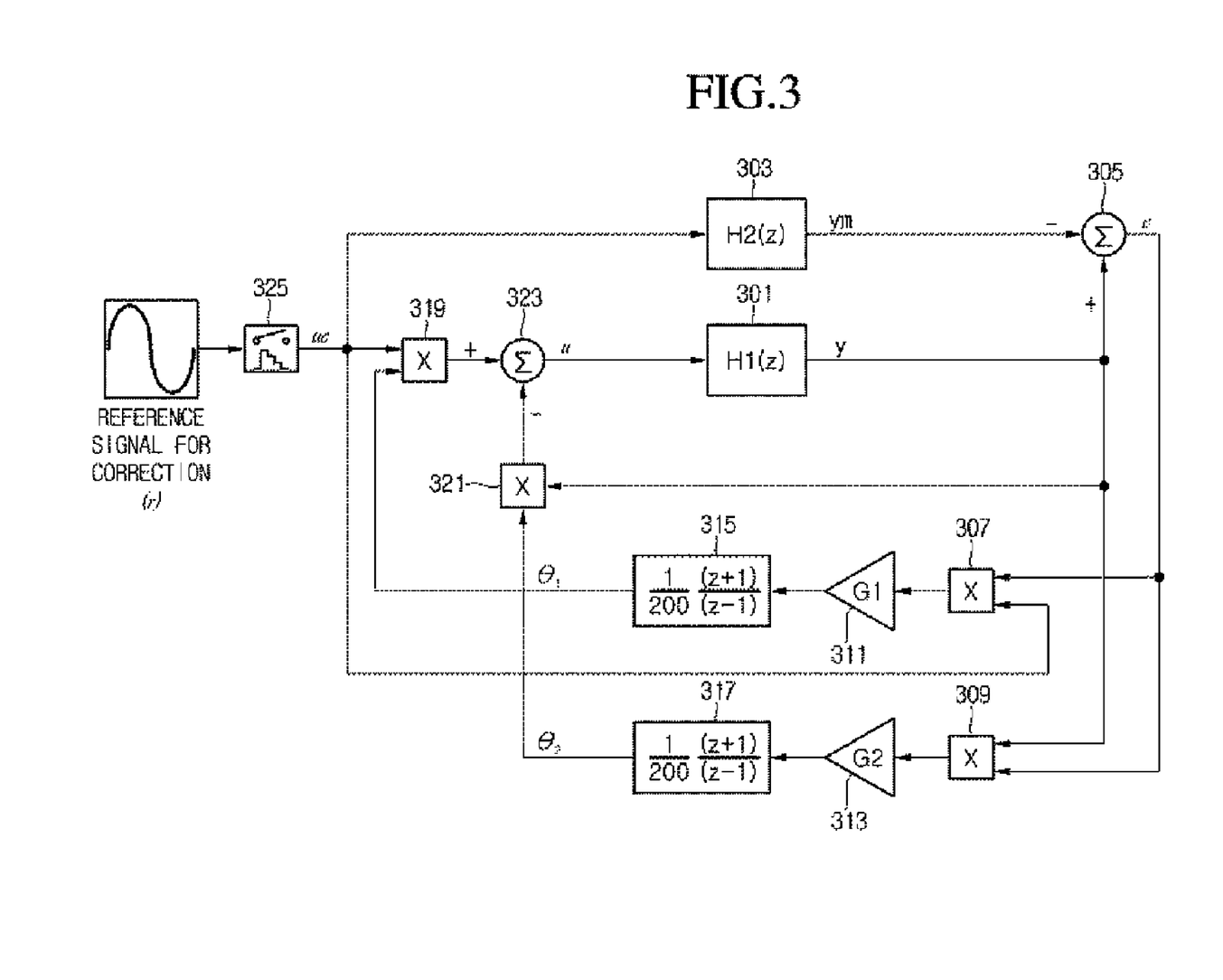
FIG. 3 is a substantial view showing a PLC analog input signal controlling apparatus in time division domain according to the embodiment.

FIG. 3 is a substantial view showing a PLC analog input signal controlling apparatus in time division domain according to the embodiment.

Referring to FIG. 3, the PLC analog input signal controlling apparatus includes a first operation unit 301, a second operation unit 303, an error calculation unit, a first parameter operation unit, a second parameter operation unit, and an error correction unit.

FIG. 3 is a view showing the PLC analog input signal controlling apparatus of continuous time domain of FIG. 2 in time division domain. Although the configuration of FIG. 3 is almost similar to that of FIG. 2, there are differences in calculations of the transfer function and the integrator between FIGS. 2 and 3. Thus, the following descriptions will be made while focusing on the difference with respect to FIG. 2 and the same description will be omitted.

The first operation unit 301 generates the analog output signal y by applying the first transfer function $H_1(z)$ to the analog input signal u. As the first operation unit 301 corresponds to the analog input module of FIG. 1, the first transfer function $H_1(z)$ may be expressed as following Equation 13:

$$H1(z) = \frac{0.7014z + 0.7014}{Z + 0.4027} \quad \text{[Equation 13]}$$

The second operation unit 303 generates the reference output signal $y_m$ by applying the second transfer function $H_2(z)$ to the reference input signal $u_c$. As the time constant of the second transfer function $H_2(z)$ is equal to that of the first transfer function $H_1(z)$ and the gain of the second transfer function $H_2(z)$ is 1, the second transfer function $H_2(z)$ may be expressed as following Equation 14:

$$H2(z) = \frac{0.6768z + 0.6768}{Z + 0.4027} \quad \text{[Equation 14]}$$

The error calculation unit calculates the difference between the analog output signal y generated from the first operation unit 301 and the reference output signal $y_m$ generated from the second operation unit 303 to generate an error signal e.

The first parameter operation unit includes a first multiplier 307, a first amplifier 311 and a first integrator 315.

The first integrator 315 integrates the results generated from the first amplifier 311. There is a difference between the integrator for time division domain of FIG. 3 and integrator for continuous time domain of FIG. 2. The difference may be caused because the integrator is z-converted in order to apply the PLC analog input signal controlling apparatus into digital domain.

For reference, in time division domain, the PLC analog input signal controlling apparatus further includes a zero order hold 325. In FIG. 3, a sampling period for using the zero order hold 325 is set into 0.001 second.

Figure 4:
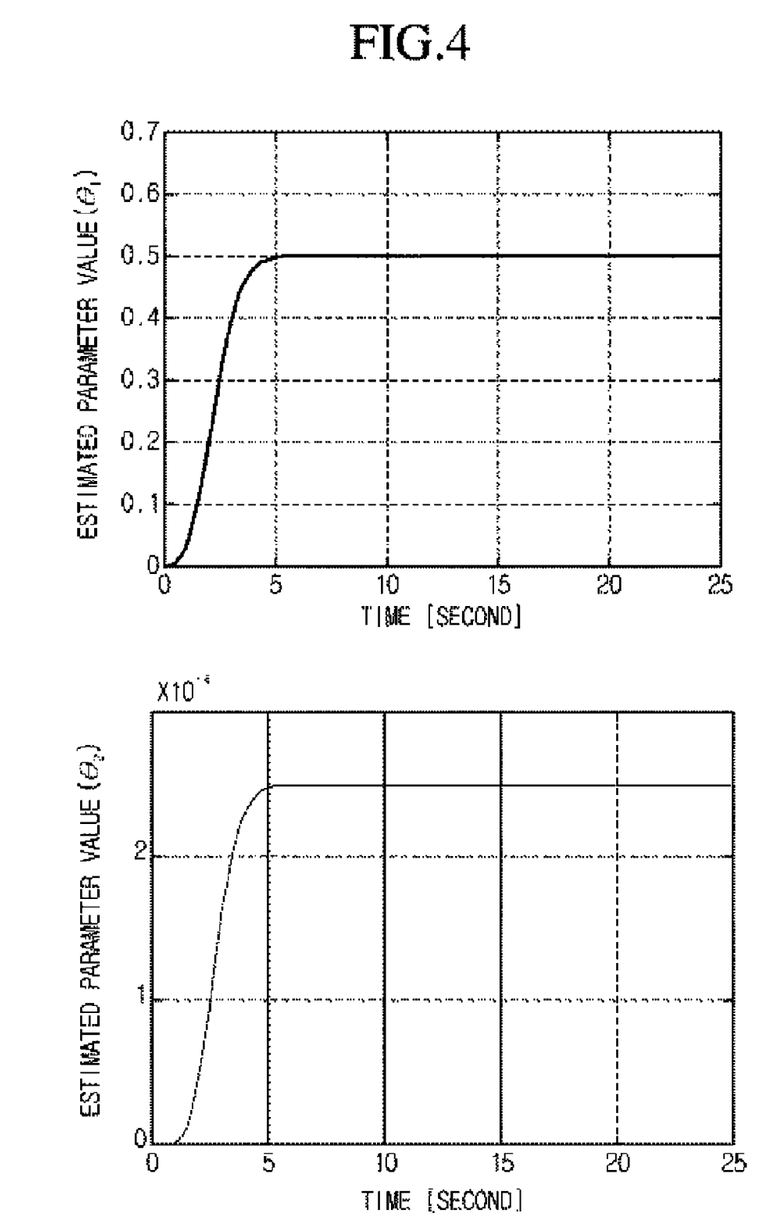
FIG. 4 is a view showing an estimation parameter on a graph, which is determined by a method of controlling a signal according to the embodiment.

FIG. 4 is a view showing an estimation parameter on a graph, which is determined by a method of controlling a signal according to the embodiment.

Referring to FIG. 4, the first and second parameters $\theta_1$ and $\theta_{12}$ expressed in Equations 7 and 8 approximate gradually to final values through an adaptive control. As adaptive control results, the first and second parameters $\theta_1$ and $\theta_{12}$ are convergent to the final values.

Figure 5:
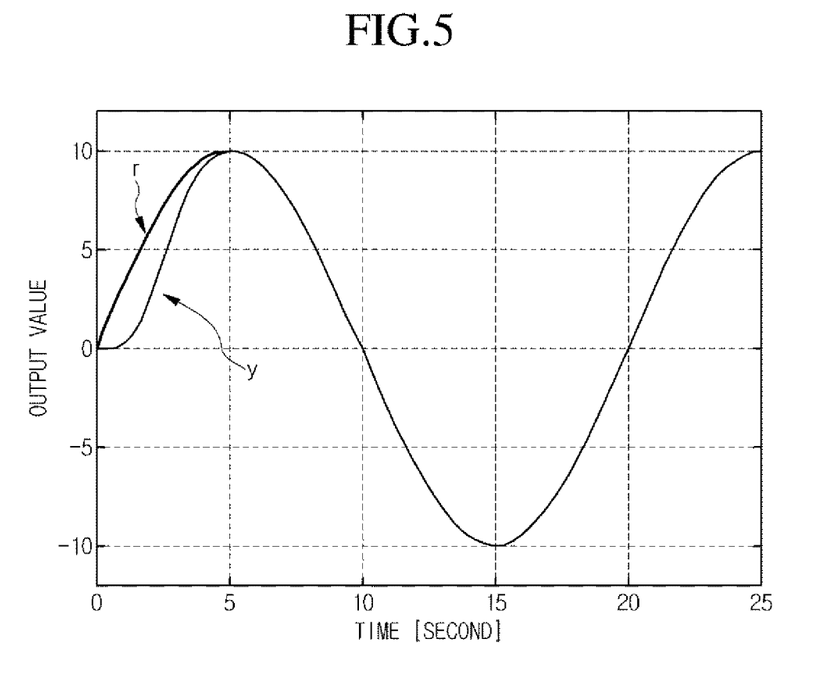
FIG. 5 is a view showing, on a graph, a result of approximating a PLC analog input signal to a reference value according to a method of controlling a signal of the embodiment.

FIG. 5 is a view showing, on a graph, a result of approximating a PLC analog input signal to a reference value according to a method of controlling a signal of the embodiment.

Referring to FIG. 5, when y is a real model output and r is a reference signal for correction, the real model output y is generated in a scheme of gradually tracking a value of the reference signal for correction. In this case, an amplitude of the reference signal r for correction may be in the permission range of the PLC analog input module and the reference signal r for correction may include a non-linear property.

The embodiment described above can be implemented not only through an apparatus and a method, but also through a program which executes the functions corresponding to the elements of the embodiment or recording media on which the program is recorded. Such an implementation may be readily embodied by those skilled in the art based on the above disclosure.

Although a preferred embodiment of the disclosure has been described for illustrative purposes, those skilled in the art will appreciate that various modifications, additions and substitutions are possible, without departing from the scope and spirit of the invention as disclosed in the accompanying claims.

What is claimed is:

1. An apparatus for controlling a signal such that a programmable logic controller (PLC) input signal is equalized to a reference input signal, the apparatus comprising:
   a first filter configured to generate a PLC output signal by removing a noise of the PLC input signal and allowing a specific frequency signal of the PLC input signal to be passed or to be blocked;
   a second filter configured to generate a reference output signal by removing a noise of the reference input signal and allowing a specific frequency signal of the reference input signal to be passed or to be blocked;

an error calculation circuit receiving the PLC output signal and the reference output signal, and configured to generate an error signal by calculating a difference value between the PLC output signal and the reference output signal;

a first multiplier circuit to multiply the reference input signal and the error signal to generate a first multiplication result;

a first amplifier to amplify the first multiplication result at a first gain to generate a first amplification result;

a first integrator circuit to integrate the first amplification result to generate the first estimation parameter;

a second multiplier circuit to multiply the PLC output signal and the error signal to generate a second multiplication result;

a second amplifier to amplify the second multiplication result at a second gain to generate a second amplification result;

a second integrator circuit to integrate the second amplification result to generate the second estimation parameter; and an error correction circuit configured to correct the error signal of the PLC input signal by generating a next PLC input signal that is equalized to the reference input signal, wherein the correction of the error signal of the PLC input signal is based on the first and second estimation parameters.

2. The apparatus of claim 1, wherein the error correction circuit corrects the error signal of the PLC input signal based on the reference input signal, the PLC output signal, the first estimation parameter and the second estimation parameter.

3. The apparatus of claim 2, wherein the error correction unit includes;

a third multiplier circuit to multiply the reference input signal and the first estimation parameter;

a fourth multiplier circuit to multiply the PLC output signal and the second parameter; and a summation circuit to generate a difference value between results generated by the third multiplier circuit and generated by the fourth multiplier circuit, wherein the difference value is the PLC input signal.

4. A method of controlling a signal such that a PLC input signal is equalized to a reference input signal, the method comprising:

generating, at a first filter, a PLC output signal by removing a noise of the PLC input signal and allowing a specific frequency signal of the PLC input signal to be passed or to be blocked;

generating, at a second filter, a reference output signal by removing a noise of a reference input signal and allowing a specific frequency signal of the reference input signal to be passed or to be blocked;

generating, at an error calculation circuit, an error signal by calculating a difference value between the analog output signal and the reference output signal;

multiplying, at a first multiplier circuit, the reference input signal and the error signal to generate a first multiplication result;

amplifying, at a first amplifier, the first multiplication result at a first gain to generate a first amplification result;

integrating, at a first integrator circuit, the first amplification result to generate the first estimation parameter;

multiplying, at a second multiplier circuit, the PLC output signal and the error signal to generate a second multiplication result;

amplifying, a second amplifier, the second multiplication result at a second gain to generate a second amplification result;

integrating, a second circuit, the second amplification result to generate the second estimation parameter; and correcting, at an error correction circuit, the error signal of the PLC input signal by generating a next PLC input signal that is equalized to the reference input signal, wherein the correction of the error signal of the PLC input signal is based on the first and second estimation parameters.

5. The method of claim 4, wherein the correcting of the error signal of the PLC input signal includes;

multiplying, at a third multiplier circuit, the reference input signal and the first estimation parameter;

multiplying, at a fourth multiplier circuit, the PLC output signal and the second parameter; and generating, at a summation circuit, a difference value between results generated from the third multiplier and generated from the fourth multiplier, wherein the difference value is the PLC input signal.

* * * * *